June 26, 1951  W. J. SIX  2,558,224

PISTON EXPANDER

Filed May 22, 1950

INVENTOR.
WALTER J. SIX.
BY
Lockwood, Hahn, Galt & Woodard.
ATTORNEYS.

Patented June 26, 1951

2,558,224

UNITED STATES PATENT OFFICE 2,558,224

PISTON EXPANDER

Walter J. Six, Indianapolis, Ind.

Application May 22, 1950, Serial No. 163,491

10 Claims. (Cl. 309—12)

This invention relates to an expander for the skirt of a piston adapted for use in the cylinder of an internal combustion engine, compression engine, steam engine and the like; and of a general character which completely encircles the interior of the skirt so as to exert its expanding force in all four cardinal directions, reference being had to my Letters Patent No. 2,034,005, granted March 17, 1936, entitled "Expander for Piston Skirts," and No. 2,383,893, granted August 28, 1945, entitled "Piston Expander."

It is the purpose of this invention to provide an expander of the above character having certain advantages over those heretofore developed, in respect to its simplicity, cost of production, ease of installation and effectiveness in the distribution of expansive force. Such expander is capable of not only being expanded after installation in the piston, but permits of a camming action to adjust and position it for expanding the split piston skirt to a selective predetermined oversize.

The feature of the invention therefore lies in providing a sliding interlock between opposed sections of the expander, wherein one section embodies a camming recess and the other section a mating locking formation for reception of a camming member movable therein to selective locking positions.

The full nature of the invention will be understood from the accompanying drawings and the following description and claims:

Figure 1:
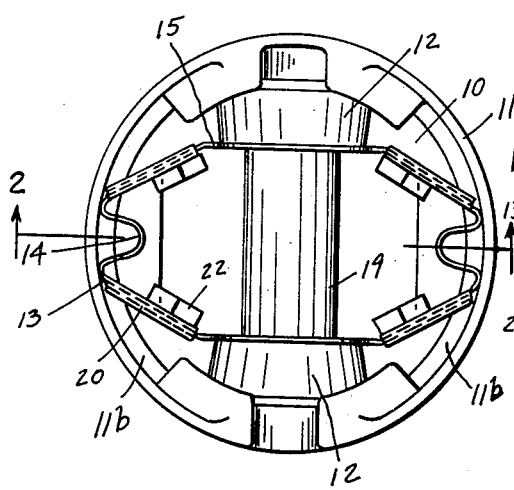
Fig. 1 is a bottom plan view of a piston showing the expander mounted therein.

In the drawings there is illustrated a piston having a head 10 and a split skirt 11 with inwardly extending wrist pin bosses 12 through which the usual wrist pin is adapted to extend.

Figure 3:
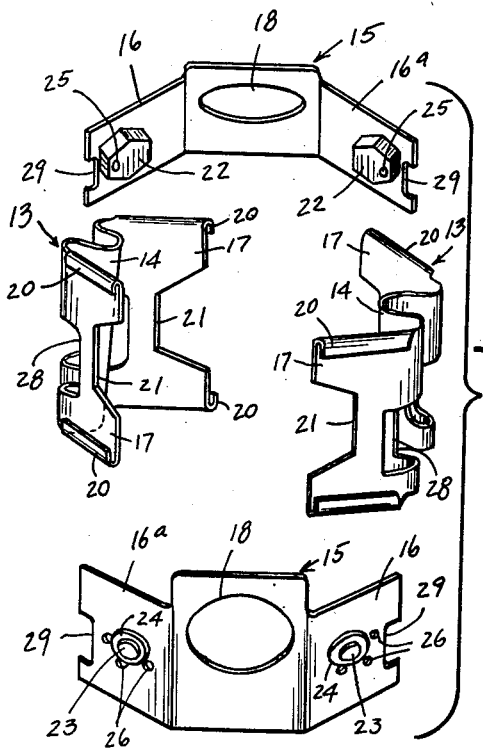
Fig. 3 is a perspective exploded view of the opposed expander sections.

The piston expander is formed of sheet metal, as shown in Fig. 3, and is preferably of metal stampings comprising opposed sections so arranged that when assembled the expander will be of a generally elongated oval cross section and of a height slightly less than the depth of the piston skirt. In general, each opposed section of the expander is provided with end portions 13 formed with inner expansion folds 14. Between the end portions there are provided boss portions 15 terminating at each end thereof with the wing portions 16 and 16a, respectively. Continuing from the end portions 13 oppositely disposed from the wing portions 16a there is provided a wing receiving portion 17. As shown in Fig. 3 the expander is formed of two opposed sections reversely duplicating each other, each formed with corresponding portions as above described.

Each of the boss sections 15 is formed with an annular aperture 18 through which a wrist pin 19 may extend after the expander is assembled and positioned in the piston. Each of the wing receiving portions 17 is formed along the upper and lower edges thereof with recess forming flanges or guideways 20 within which the wing portions 16 are adapted to slide. Each receiving portion 17 is provided with a camming recess 21 centrally arranged intermediate said receiving portions.

Figure 4:
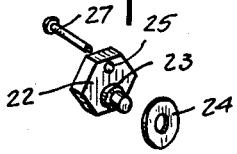
Fig. 4 is a perspective exploded view of one of the camming elements.

Rotatably and eccentrically mounted upon each of the wing portions 16 and 16a, adjacent the inner surface thereof, there is a camming member 22, as shown in Fig. 4. Said member is in the form of a hex nut having an eccentrically positioned boss 23 thereon. Said boss is adapted to extend through an aperture in said wing portions for rotation therein, said aperture serving as a bearing therefor. With the boss 23 extending through the aperture a burr 24 is mounted over the boss, with the free end of the boss peened over the burr for retaining the camming member thereon. Said camming member is also provided with an aperture 25 extending therethrough adapted to register when rotated to camming adjustments with a series of corresponding apertures 26 in said wing portions.

Figure 2:
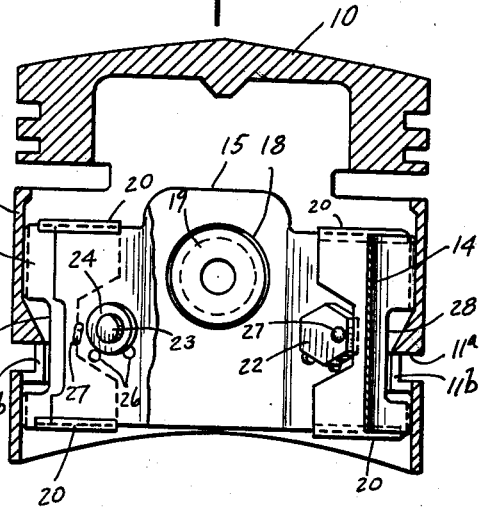
Fig. 2 is a section taken on the line 2—2 of Fig. 1.

Said camming member 22 through suitable wrench engagement may be turned to different camming positions into engagement with its associated camming recess 21. When the expander is set to its full expanded position by such camming action, the camming member is locked in its final adjusted position by a headed locking pin 27 manually inserted through the aperture 25 into the selected aperture 26, after which the exposed end of the pin is peened down for locking it, as shown on the left-hand side of Fig. 2.

The expander elements, as shown in the exploded relation of Fig. 3, are assembled by inserting the respective wings 16, 16a in the wing receiving portions 17 between the flanges 20 and with the camming element in its retracted position. This permits the expander to be so contracted as to allow it to be freely inserted into the piston skirt. In piston skirts having a ring groove 11a resulting in an internal annular rib 11b, Fig. 2, the contracted expander may be readily passed into position thereover. For accommodating such a rib the end portions 13 are notched out or recessed at 28 for registering with a companion recess 29 in each end of the wing for accommodating such rib 11b when the expander is in position.

After the expander has been placed in position within the skirt in its contracted form, a wrench is engaged over the hex nut camming member for rotating it from its retracted position to its expanding position wherein the side walls of said member bear aganst their respective camming recesses 21 for camming the end portions 13 outwardly against the piston skirt. Through this medium such expander tension is applied to the skirt as to expand it to the desired oversize, whereupon the locking pin 27 is inserted through the then registering apertures 25, 26, and the end thereof peened over.

Whereas the invention has been described in respect to the expander having separate side and end portions with four camming elements, it may take the form of a two-piece expander, wherein one of the end portions 13 is formed integrally with the boss portions with only one end portion slidably adjustable thereon. In this form only two camming members are required, but the degree of expansion is reduced substantially one-half. This form with the single rather than the double expander end portions may be employed in skirts having no lower ring grooves, such as identified at 11a, 11b.

The invention claimed is:

1. A piston expander of generally oval form adapted to be inserted and expanded within a piston skirt, said expander embodying opposed side and end sections engageable therewith, at least one of said end sections being slidably mounted on adjacent ends of said side sections, and camming members eccentrically mounted on one of said slidable sections for rotatable adjustment into camming engagement with adjacent ends of the other section for permitting said expander to be contracted upon said camming members being rotated to their retracted position and expanded upon being eccentrically rotated to an expanding position.

2. A piston expander of generally oval form adapted to be inserted and expanded within a piston skirt, said expander embodying opposed boss-engaging side sections providing a fixed portion of the expander and skirt engaging end sections providing an expanding portion thereof, at least one of said end sections being slidably mounted on the adjacent ends of said side sections, and camming members eccentrically mounted on one of said portions for rotatable adjustment into camming engagement with the adjacent ends of the other portion for permitting said expander to be contracted upon said camming members being rotated to retracted position and expanded upon being rotated to eccentric position.

3. A piston expander of generally oval form adapted to be inserted and expanded within a piston skirt, said expander embodying opposed boss-engaging side sections providing a fixed portion of the expander and skirt engaging end sections providing an expanding portion thereof, at least one of said end sections being slidably mounted on the adjacent ends of said side sections, camming members eccentrically mounted on one of said portions for rotatable adjustment into camming engagement with the adjacent ends of the other portion for permitting said expander to be contracted upon said camming members being rotated to retracted position and expanded upon being eccentrically rotated, and means for locking said camming members in their eccentrically rotated expanding position.

4. A piston expander of generally oval form adapted to be inserted and expanded within a piston skirt, said expander embodying a fixed portion comprising opposed boss engaging side sections and an expanding portion comprising at least one end section engageable with the piston skirt intermediate the boss portions thereof, means for slidably associating said portions, and camming nuts each having an eccentric boss rotatably mounted on one of said portions for camming engagement with the adjacent end edges of the other said portion, said nuts being rotatable about their eccentric bosses to a retracted position for permitting said portions to slide relative to each other to expander contracted position, said nuts being rotatable to a camming position about said bosses to force said expanding portion in a direction to effect expansion of said expander and piston skirt.

5. A piston expander of generally oval form adapted to be inserted and expanded within a piston skirt, said expander embodying a fixed portion comprising opposed boss engaging side sections and an expanding portion comprising at least one end section engageable with the piston skirt intermediate the boss portions thereof, means for slidably associating said portions, camming nuts each having an eccentric boss rotatably mounted on one of said portions for camming engagement with the adjacent end edges of the other said portion, said nuts being rotatable about their eccentric bosses to a retracted position for permitting said portions to slide relative to each other to expander contracted position, said nuts being rotatable to a camming position about said bosses to force said expanding portion in a direction to effect expansion of said expander and piston skirt, and means for locking said camming nuts in their camming position.

6. A piston expander of generally oval form adapted to be inserted and expanded within a piston skirt, said expander embodying a fixed portion comprising opposed boss engaging side sections and an expanding portion comprising at least one end section engageable with the piston skirt intermediate the boss portions thereof, means for slidably associating said portions, apertured camming nuts each having an eccentric boss rotatably mounted on one of said portions for camming engagement with the adjacent end edges of the other said portion, said nuts being rotatable about their eccentric bosses to a retracted position for permitting said portions to slide relative to each other to expander contracted position, said bosses being rotatable to a camming position about said eccentric bosses to force said expanding portion in a direction to effect expansion of said expander and piston skirt, and a locking pin insertable through the aperture in each of said nuts and a selected one of a plurality of arcuately spaced apertures in said expander for securing said nut in a camming position.

7. A piston expander of generally oval form adapted to be inserted and expanded within a piston skirt, said expander embodying a pair of opposed side sections provided with angularly disposed wings, end sections formed with inner expansion folds and angularly extending wings, the wings of at least one of said end sections being slidably mounted relative to the adjacent wings of said side sections, and a wrench engageable camming nut having an eccentric boss rotatably mounted on the inner side of the side section wings for camming engagement with adjacent end edges of the end section wings, each of said nuts being rotatable about its eccentric boss to a retracted position for permitting said wings to slide relative to each other to an expander contracting position and rotatable in a camming direction to force said wings into skirt expanding position.

8. A piston expander of generally oval form adapted to be inserted and expanded within a piston skirt, said expander having boss engaging portions terminating in angularly disposed wing portions, end portions provided with expansion folds therein slidably mounted on said wing portions, folded flanges on said end portions to maintain said portions in sliding alignment, and means on one of said portions for camming the other portion to piston expanding position.

9. A piston expander of generally oval form adapted to be inserted and expanded within a piston skirt, said expander having boss engaging portions terminating in angularly disposed wing portions, end portions provided with expansion folds therein slidably mounted on said wing portions, folded flanges on said end portions to maintain said portions in sliding alignment, and wrench engageable camming nuts eccentrically pivoted on said wing portions for camming engagement against the end edges of said end portions for forcing them into piston expanding position upon said camming nuts being rotated about their pivotal mounting.

10. A piston expander of generally oval form adapted to be inserted and expanded within a piston skirt having an internal annular rib, said expander having boss engaging portions terminating in angularly disposed wing portions, end portions provided with expansion folds therein slidably mounted on said wing portions, folded flanges on said end portions to maintain said portions in sliding alignment, each of said end portions being released on said side of its expansion fold for embracing and straddling the rib on said piston skirt, and camming elements movable to expanding position for engaging and spreading said end portions into skirt expanding position.

WALTER J. SIX.

REFERENCES CITED

The following references are of record in the file of this patent:

UNITED STATES PATENTS

| Number | Name | Date |
| --- | --- | --- |
| 1,921,429 | Prochaska | Aug. 8, 1933 |
| 2,350,064 | Paton | May 30, 1944 |